US011182406B2

(12) United States Patent
Zhang et al.

(10) Patent No.: US 11,182,406 B2
(45) Date of Patent: Nov. 23, 2021

(54) INCREASED DATA AVAILABILITY DURING REPLICATION

(71) Applicant: INTERNATIONAL BUSINESS MACHINES CORPORATION, Armonk, NY (US)

(72) Inventors: He Fang Zhang, Beijing (CN); Peng Hui Jiang, Beijing (CN); Wei Guo, Beijing (CN); Yue Li, Beijing (CN); Jin Ping Lin, Beijing (CN); Meng Zhao, Beijing (CN); Qian Tao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 16/832,032

(22) Filed: Mar. 27, 2020

(65) Prior Publication Data
US 2021/0303597 A1    Sep. 30, 2021

(51) Int. Cl.
*G06F 16/27*    (2019.01)
*G06F 16/242*    (2019.01)
*G06F 16/22*    (2019.01)

(52) U.S. Cl.
CPC ........ *G06F 16/275* (2019.01); *G06F 16/2282* (2019.01); *G06F 16/2433* (2019.01)

(58) Field of Classification Search
CPC ...... G06F 16/27; G06F 9/505; G06F 11/3409; G06F 16/2453
USPC ....................................................... 707/610
See application file for complete search history.

(56) References Cited

U.S. PATENT DOCUMENTS

| 7,853,561 B2 | 12/2010 | Holenstein |
| 8,121,978 B2 | 2/2012 | Wiss |
| 8,301,593 B2 | 10/2012 | Hoffmann |
| 9,442,995 B2 | 9/2016 | Pareek |

(Continued)

FOREIGN PATENT DOCUMENTS

CN        101939737 A    1/2011

OTHER PUBLICATIONS

Well, Peter et al.; "The NIST Definition of Cloud Computing;" National Institute of Standards and Technology; Special Publication 800-145; Sep. 2011; 7 pages.

(Continued)

*Primary Examiner* — Hung T Vy
(74) *Attorney, Agent, or Firm* — Schmeiser, Olsen & Watts; Stephanie Carusillo

(57) ABSTRACT

A data-replication system replicates a source database to a target database by first intelligently identifying and prioritizing a set of hot queries that have each in the past been submitted to the source database at a rate exceeding a threshold submission rate. Any previously replicated content contained in a database table accessed by a hot query is copied to a set of memory-resident blocks. The blocks are then updated with incremental changes made to the table's contents since the most-recent previous replication. Each updated block is copied to the target database in order of the priority of the block's corresponding hot query. When all blocks that contain data of a particular table have been copied into the target database, that table becomes available to users of the target database despite the fact that the entire database has not yet been fully replicated.

20 Claims, 11 Drawing Sheets

(56) References Cited

U.S. PATENT DOCUMENTS

2010/0332513 A1\* 12/2010 Azar ................... G06F 16/9574
                                                          707/769
2014/0164328 A1    6/2014 Calo
2018/0307568 A1\* 10/2018 Braddy ............... G06F 11/1662
2020/0372084 A1\* 11/2020 Kolobov ............... G06F 16/951

OTHER PUBLICATIONS

Amutha, M. et al.; Optimized Data Replication in Cloud Using PSO Algorithm based on Prioritization; Journal of Advanced Research in Dynamical & Control Systems; 05-Special Issue; Jul. 2017; 10 pages.

Ragunathan, T. et al.; Frequent Block Access Pattern-Based Replication algorithm for Cloud Storage Systems; 2015 Eighth International Conference on Contemporary Computing; Aug. 20-22, 2015; 6 pages.

Zhou, Jian et al.; Pattern-Directed Replication Scheme for Heterogeneous Object-based Storage; 17th IEEE/ACM International Symposium on Cluster, Cloud and Grid Computing; May 14-17, 2017; pp. 645-648.

\* cited by examiner

INCREASED DATA AVAILABILITY DURING REPLICATION

BACKGROUND

The present invention relates in general to information technology and in particular to technologies and systems that replicate data.

Automated data-replication technology non-disruptively moves or copies data from a source repository of data to a target repository, such as from a local database to a remote database at a geographically distinct site. This technology can also be used to synchronize two copies of the same data repository, or two synchronize related source and target data repositories are being accessed by distinct, different users or by distinct, different applications. Such systems and software tools ensure the accuracy of replication data by first replicating (or "refreshing") data that has not changed since the previous replication of the same source, and then replicating (or "mirroring") incremental data that has been added, revised, or deleting since the previous replication.

A refreshing operation can take hours, days, or even weeks when replicating the enormous data repositories maintained by applications like online transaction-processing (OLTP) and data-warehousing systems. In current implementations, portions of the target repository are made unavailable to users until the refreshing is complete and mirroring catches up. This prevents users from accessing a partially replicated data item, such as a database table or column for what may be an extended length of time.

SUMMARY

Embodiments of the present invention comprise systems, methods, and computer program products for replicating a source database to a target database. A data-replication system replicates a source database to a target database by first intelligently identifying and prioritizing a set of hot queries that have each in the past been submitted to the source database at a rate exceeding a threshold submission rate. Any previously accessed content contained in a database table accessed by a hot query is copied to a set of memory-resident blocks. The blocks are then updated with incremental changes made to the table's contents since the most-recent previous replication. Each updated block is copied to the target database in order of the priority of the block's corresponding hot query. When all blocks that contain data of a particular query have been copied into the target database, that query becomes available to use the target database despite the fact that the entire database has not yet been fully replicated.

DETAILED DESCRIPTION

Figure 1:
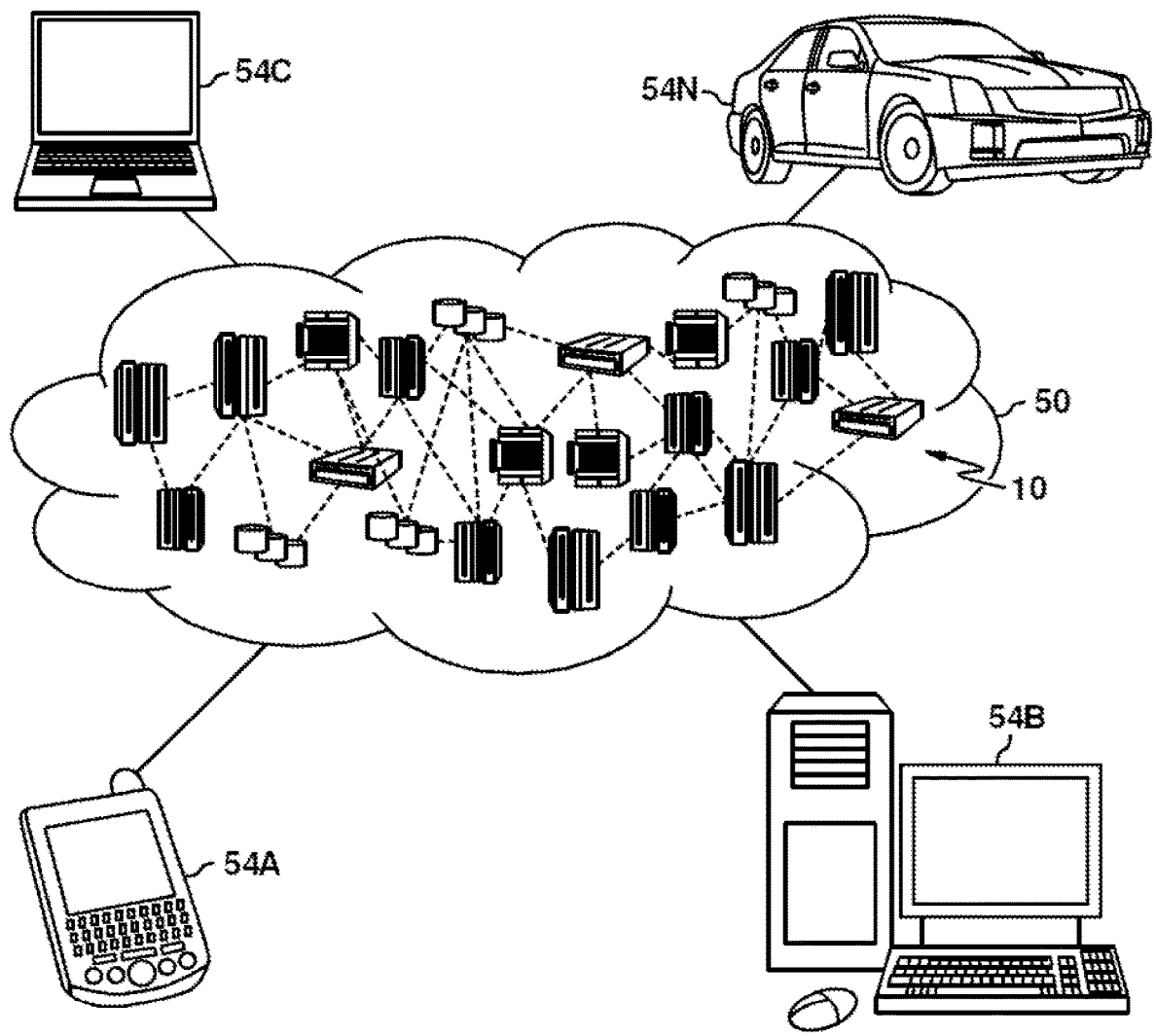
FIG. 1 depicts a cloud computing environment according to an embodiment of the present invention.

Existing replication systems would benefit from an improved replication technology that reduces the time and cost of making data available for replication.

Businesses generally schedule replication jobs to be performed on a fixed, predetermined schedule and allocate a fixed, predetermined set of resources for each task. A replication task may fail, or may require human intervention, if the task takes longer than an allocated duration of time or requires more than an allocated amount of resources.

Furthermore, a replication task's refreshing operation can take hours, days, or even weeks to replicate the enormous data repositories maintained by applications like online transaction-processing (OLTP) and data-warehousing systems. In current implementations, portions of the target repository become unavailable to users during the mirroring operation to prevent users from accessing or revising a partially replicated data item, such as a database table or column. Replication can thus make a database or other data repository unavailable for an extended period of time.

Conventional mirroring operations that wait for the refreshing operation completed to start can also consume large amounts of resources. These resourced can include the disk space and RAM needed to assemble and store logs and to stage numerous or complex replication tasks.

Embodiments of the present invention improve existing replication technology by allowing replication tasks to be scheduled intelligently. This scheduling is performed as a function of usage patterns associated with applications that access the data being replicated.

This improvement comprises a mechanism that combines a replication's refresh subtasks, which replicate data that already exists on the target, and mirroring subtasks that interleave incremental data on the target with the existing refresh data. Embodiments perform refresh and mirroring tasks concurrently, merging incremental data into memory-resident blocks that contain existing refresh data, and then replicating those blocks to a target system. These blocks are replicated in an order based on priorities inferred from usage patterns associated with applications that use the source repository. In other words, embodiments of the present invention employ a user-centric approach that replaces the traditional push model of replication, which initiates a replication in response to an express request, with a pull model that itself determines, based on users' usage patterns, the order in which to replicate specific data elements.

Systems, methods, and computer-program products based on such embodiments use cognitive, artificially intelligent, inference engines trained through machine-learning technology to identify data-access patterns of target applications, generate corresponding data-access requests and queries, and then send those requests and queries to a source-location server located in virtual proximity to a source repository of data to be replicated. These requests and queries specify which requested blocks of replication data are given a higher priority, and the source server is directed to replicate higher-priority requested blocks of replication data prior to replicating lower-priority blocks. In this way, the embodiment minimizes the amount of time that the most commonly accessed target data items are unavailable to users, and that the target database is unable to service the most popular data-access requests.

This procedure is facilitated by a novel set of internal replication tables maintained by servers at both the source and target locations. These tables perform functions that include relating queries with particular database tables and memory-resident blocks of replicated data and determining when a block should be transferred to the target server or applied by the target server to the target data repository.

The below figures describe steps of these procedures in greater detail.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
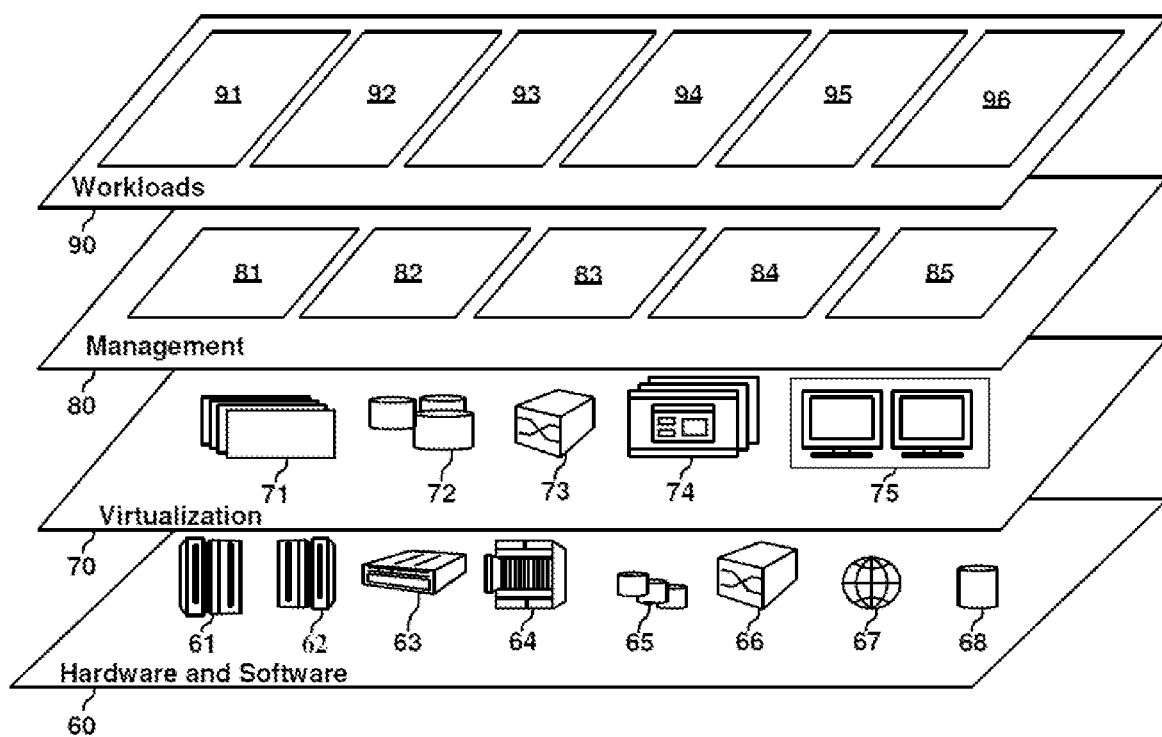
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex data-replication tasks 96.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
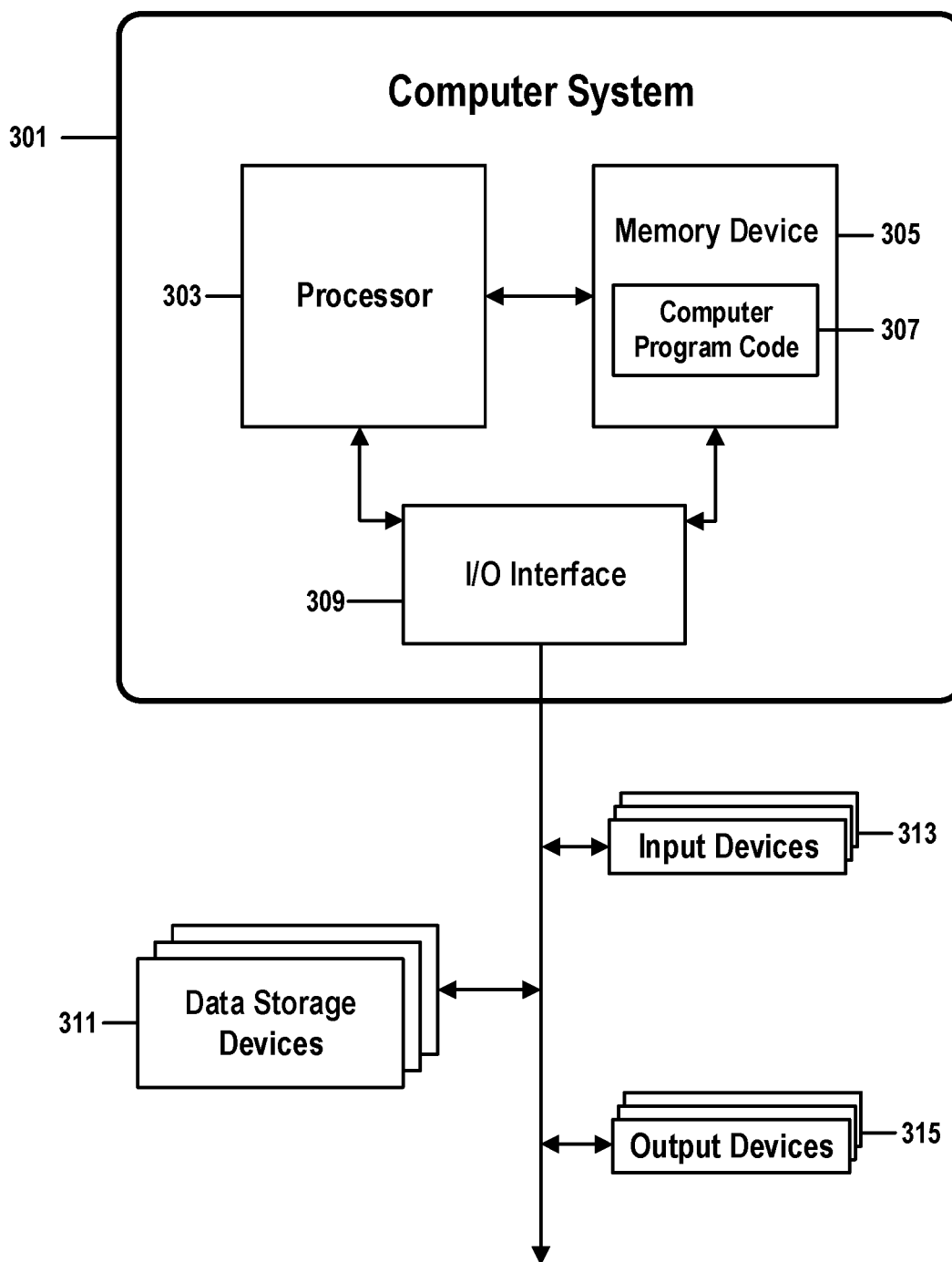
FIG. 3 shows the structure of a computer system and computer program code that may be used to implement a method for increased data availability during replication in accordance with embodiments of the present invention.

FIG. 3 shows a structure of a computer system and computer program code that may be used to implement a method for increased data availability during replication in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for increased data availability during replication in accordance with embodiments of the present invention, and may implement other embodiments described in this specification, including the methods illustrated in FIGS. 1-11. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for increased data availability during replication.

Any of the components of the present invention could be created, integrated, hosted, maintained, deployed, managed, serviced, supported, etc. by a service provider who offers to facilitate a method for increased data availability during replication. Thus the present invention discloses a process for deploying or integrating computing infrastructure, comprising integrating computer-readable code into the computer system 301, wherein the code in combination with the computer system 301 is capable of performing a method for increased data availability during replication.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for increased data availability during replication may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for increased data availability during replication is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
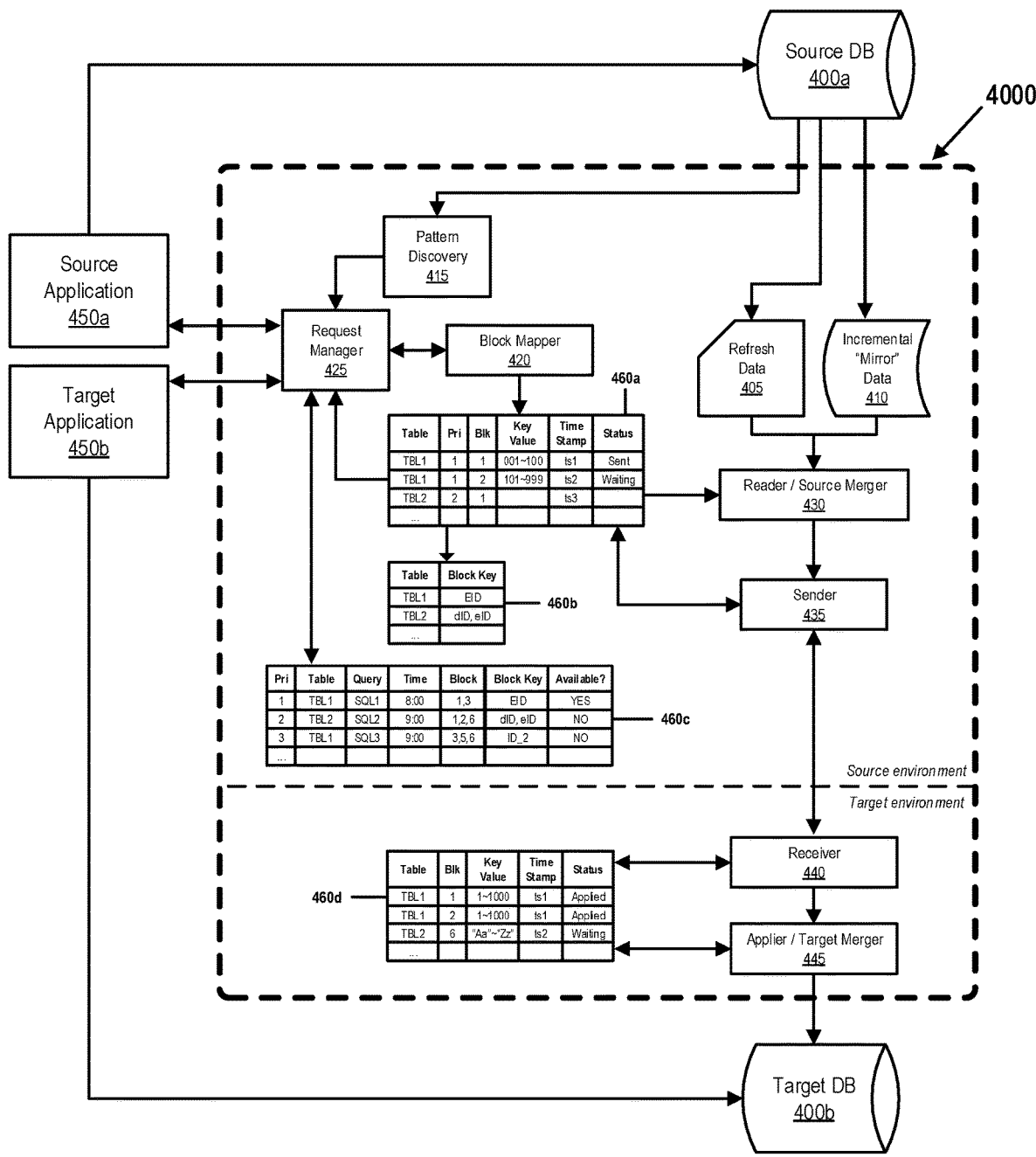
FIG. 4 shows a framework for implementing a method to increase data availability during replication in accordance with embodiments of the present invention.

FIG. 4 shows a framework of a data-replication system 4000 for implementing a method to increase data availability during replication in accordance with embodiments of the present invention. FIG. 4 shows items 400-460d and 4000. The upper portion of framework 4000 shows entities located at the location of the source database 400a that is being replicated and the lower portion, separated from the upper portion by a horizontal dotted line, shows entities located at the location of the target database 400b to which the replicated data is stored.

The system of FIG. 4 replicates data stored in a source database or data repository 400a to a target database or data repository 400b. The source data or the target data is accessed by users of an application 450, depending on the availability of the target data.

The framework comprises:
  a Pattern Discovery component 415 that uses cognitive or artificially intelligent methods to infer, from transaction logs and other historical records, patterns of data usage that indicate how users of application 450 access data stored in the source database 400a. The Pattern Discovery component 415 then uses this information to identify database queries that represent the most common data-access queries or requests submitted by users;
  a Block Mapper component 420 analyzes each query or request generated by the Pattern Discovery component 415 in order to identify the tables or other data elements of source database 400a accessed by each query. These tables are each stored in one or more memory-resident blocks that are managed by replication system 4000 during the replication process, which comprises storing a table's previously replicated (existing or "refresh") data 405 in that table's corresponding blocks and then updating each block incremental or "mirrored" data 410 that has been generated since the last replication. The Block Mapper 420 then selects an indexing method to be used by the replication system 4000 when accessing each table with a particular query. Block Mapper 420 records the indexing method in entries written to Block Keys table 460*b* and Block Definition table 460*a*. In some embodiments, data contained in Block Definition table 460*a* can substitute for RM table 460*c*, since Block Definition table 460*a* contains at least the basic data items required by a RM table 460*c*:

- a Request Manager component 425 processes incoming user requests received from application 450 and determines if the request could be directed to target database 400*b*. Request Manager retrieves records from a Request Manager ("RM") table 460*c* that each identify a database table and corresponding memory-resident block that is not yet ready to be replicated or already be replicated to the target database 400*b*. Request Manager 425 also performs other tasks related to processing and tracking each generated query, such as splitting SQL (Structured Query Language) queries that contain a JOIN predicate into two queries that each access only one database table;
- a Reader/Source Merger component 430 that merges incremental data 410 into memory-resident blocks that already contain existing refresh data 405, prior to transmission of the memory-blocks to the target location;
- a Sender module 435 that receives memory-resident blocks of refresh and mirror data deemed by the Reader 430 to be ready to replicate to the target database 400*b* and then transmits these blocks to the target location;
- a Receiver module 440, residing at the target location, that receives the blocks transmitted from the source location by Sender 435; and
- an Applier/Target Merger module 445 that that updates the target database 400*b* by "applying" the received blocks of data to the target database 400*b*. The Applier 445 also updates a target-side Block Status Table 460*d* to identify the change in status of each applied block.

The depictions of replication tables 460*a*-460*d* shown in FIG. 4 are exemplary. The present invention is flexible enough to accommodate additional columns in each table, as desired by an implementer. In all embodiments, however, the columns shown in FIG. 4 must be present. In the embodiments and examples presented in this document, replication tables 460*a*-460*d* consist solely of the columns shown in FIG. 4. Furthermore, in certain embodiments target-side analogs of tables 460*a*-460*c*, which contain similar or identical columns, are generated by target-side modules of replication system 4000. These target-side tables may be populated and maintained automatically by various modules of replication system 4000 in accordance with methods described in the following figures.

In certain embodiments, functional components or subsystems replication system 4000 consist solely of the seven modules 415-445, which each perform functions of FIGS. 5-11. In all embodiments, replication system 4000 manages replication workflows by maintaining a group of replication tables, which may include tables 460*a*-460*d*, that contain, among other things, the current status of each memory-resident block; relations between memory blocks, database tables, and popular queries; and the availability of each popular query to users. In some embodiments, the replication tables used for this purpose by replication system 4000 are limited solely to the tables described in this document, including source-side Block Definition table 460*a* and its analogous target-side Block Definition table; Block Keys table 460*b*; source-side Request Manager table 460*c* and its analogous target-side Block Keys table; and target-side Block Status table and an analogous source-side Block Status table. In certain embodiments, all replications tables are limited to exactly the columns shown in the examples of FIGS. 4-11, and, when noted in the figures, a source-side replication table and its target-side analog may contain slightly different sets of columns.

Figure 5:
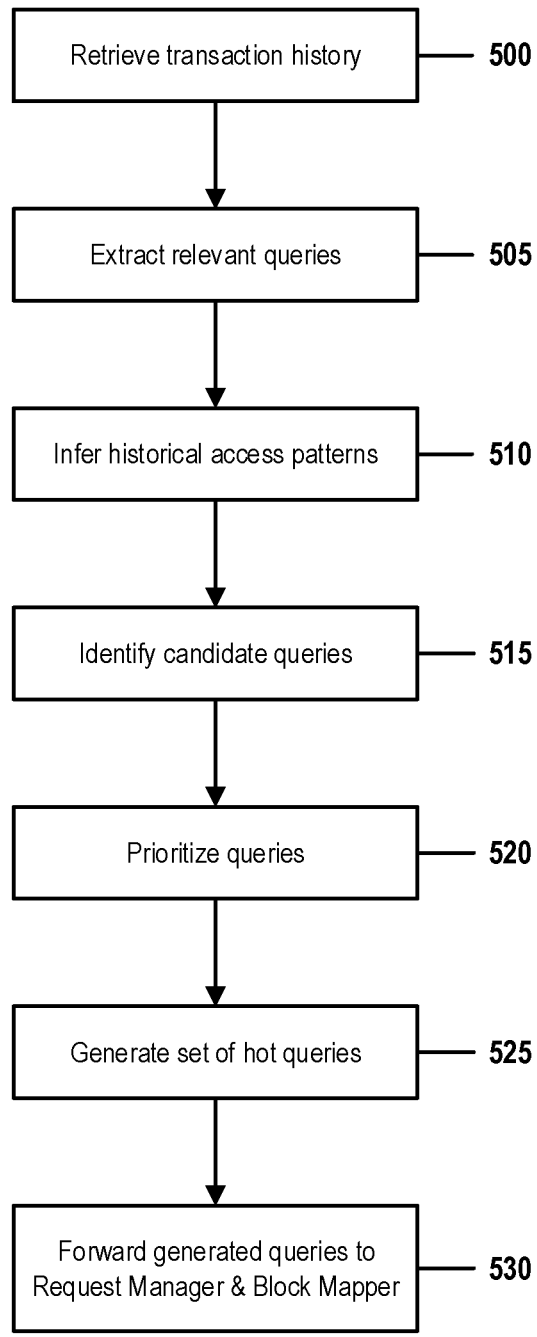
FIG. 5 is a flow chart that illustrates steps performed by a Pattern Discovery module of a data-replication system, in accordance with embodiments of the present invention.

FIG. 5 is a flow chart that illustrates steps performed by a Pattern Discovery module 415 of a data-replication system 4000, in accordance with embodiments of the present invention. FIG. 5 contains steps 500-530.

In step 500, Pattern Discovery module 415 retrieves a transaction history, database log, or other records that enumerate user queries submitted to source database 400*a*.

In step 505, Pattern Discovery module 415 begins a procedure for identifying the "hottest" transactions, queries, or other user-submitted requests to access data stored in source database 400*a*. In this context, a first request is deemed to be "hotter" than a second request if an extended inability to service the first request would be more detrimental to a business objective than would a similar inability to service the second request.

These determinations may be inferred, from the historical records retrieved in step 500, by any means known in the art. The examples and embodiments of FIG. 5 describe one possible procedure for performing this operation, but the present invention is flexible enough to accommodate other procedures known in the art. In all cases, however, Pattern Discovery module 415 selects a set of hot access requests through an application of cognitive computing or artificial-intelligence technology, such as machine-learning or semantic analytics.

In step 505, Pattern Discovery module 415 extracts, from the retrieved transaction history, records of past requests to access data in source database 400*a*. Each extracted record may, for example, identify a distinct, time-stamped SQL (Structured Query Language) query.

In step 510, certain embodiments of Pattern Discovery module 415 organize the extracted records by time of day, accessed tables, frequency of submission, or by other parameters, such as by a predefined priority associated with a characteristic of the application or of the tables that the queries access.

In one example, Pattern Discovery module 415 in this step identifies and extracts from the historical record 400 distinct queries that were submitted from 8:00 AM through 9:00 AM each weekday, and that access database table Usr.Address of source database 400*a*. Module 415 deems a particular SQL query "Query A01" as being "hot" because: i) administrators have assigned table Usr.Address a High priority based on that table's relatively great importance to a business function; ii) Query A01 was submitted 140 times during the 8:00-9:00 time period, which exceeds a threshold level of 100 submissions/hour; and iii) the 8:00-9:00 time period is assigned a High priority because that period is typically a peak-usage period, when systems resources are at a premium and Shipping Department employees have an especially urgent need to promptly access customer data from table Usr.Address. Therefore, an inability to access table Usr.Address during this time would adversely affect the operation of the user application 450.

In some embodiments, Pattern Discovery module 415 is trained by known methods of machine-learning to intelligently discover or derive inferences that underlie these determinations of relative hotness. For example, a machine-learning-based training module may have submitted corpora to Pattern Discovery module 415 in order to train the module 415 to correlate usage patterns, manually assigned priorities, database and application performance statistics, and other characteristics of archived queries and of the data accessed by the archived queries.

In step 515, Pattern Discovery module 415 identifies the highest-priority candidate queries, based on inferences and analyses performed during steps 505 and 510. In some embodiments, Pattern Discovery Module 415 selects a single highest-priority query for each table of source database 400a, but in other embodiments, other selection methods, if preferred by an implementer, may be selected. For example, an implementer may select the two hottest or three hottest queries that access a particular table or may determine the number of queries to be selected for a particular table as a function of that table's manager-assigned priority or business value. In yet other embodiments, module 415 may select all queries that are submitted at least a certain threshold number of times or that are submitted with at least a certain predefined threshold frequency. In such embodiments, either threshold may be varied as a function of a combination of a time of day, a day of the week, or a month of the year of the query's time stamp; as a business-selected priority of database table accessed by the query or of the user application 450 that generated the query; or of any other technical- or business-dependent parameter that an implementer deems to be significant.

In step 520, Pattern Discovery module 415 performs any remaining prioritization or sorting tasks necessary to rank the selected candidate queries in order of importance. When so ordered, the hottest, highest-priority, and highest-ranking queries will be those that are most critical to the business function of the user application 450. In other words, a first query will be considered hotter, and will be ranked higher, than a second query if an inability to service the first query during a replication task would be more detrimental to the business function than an inability to service the second query for the same duration of time.

In some embodiments, this ranking is a rough estimate, based on factors listed above, or is a mere sorting of queries into tiers or bins. In other embodiments, the ranking is a function of a quantitative or numerical priority value assigned to each candidate query by means of a function of parameters described in steps 505-515. In yet another embodiment, the ranking is performed so as to order the queries in order of the detrimental effect on a business objective generated by an inability to service each query during replication. The present invention is flexible enough to accommodate any sort of ranking methodology preferred by an implementer, whether as a function of technical or business priorities, or of other factors deemed relevant to the replication task being implemented.

Regardless of computational details selected by an implementer, at the conclusion of step 520, Pattern Discovery module 415 will have identified a list of hot queries that should be given priority during the replication task currently being performed by replication system 4000. In some embodiments, Pattern Discovery module 415 will also have grouped or fully ordered the listed hot queries in order of hotness.

In step 525, Pattern Discovery module 415 selects a subset of the listed queries, where queries in the subset are deemed to have the highest replication priority, or highest degree of hotness, as determined in preceding steps of FIG. 5.

In step 530, Pattern Discovery module 415 transmits the subset of queries to the Request Manager 425 of replication system 4000, where the queries will be used to determine the order in which blocks of data should be replicated to target database 400b. This procedure is described in FIG. 6.

Figure 6:
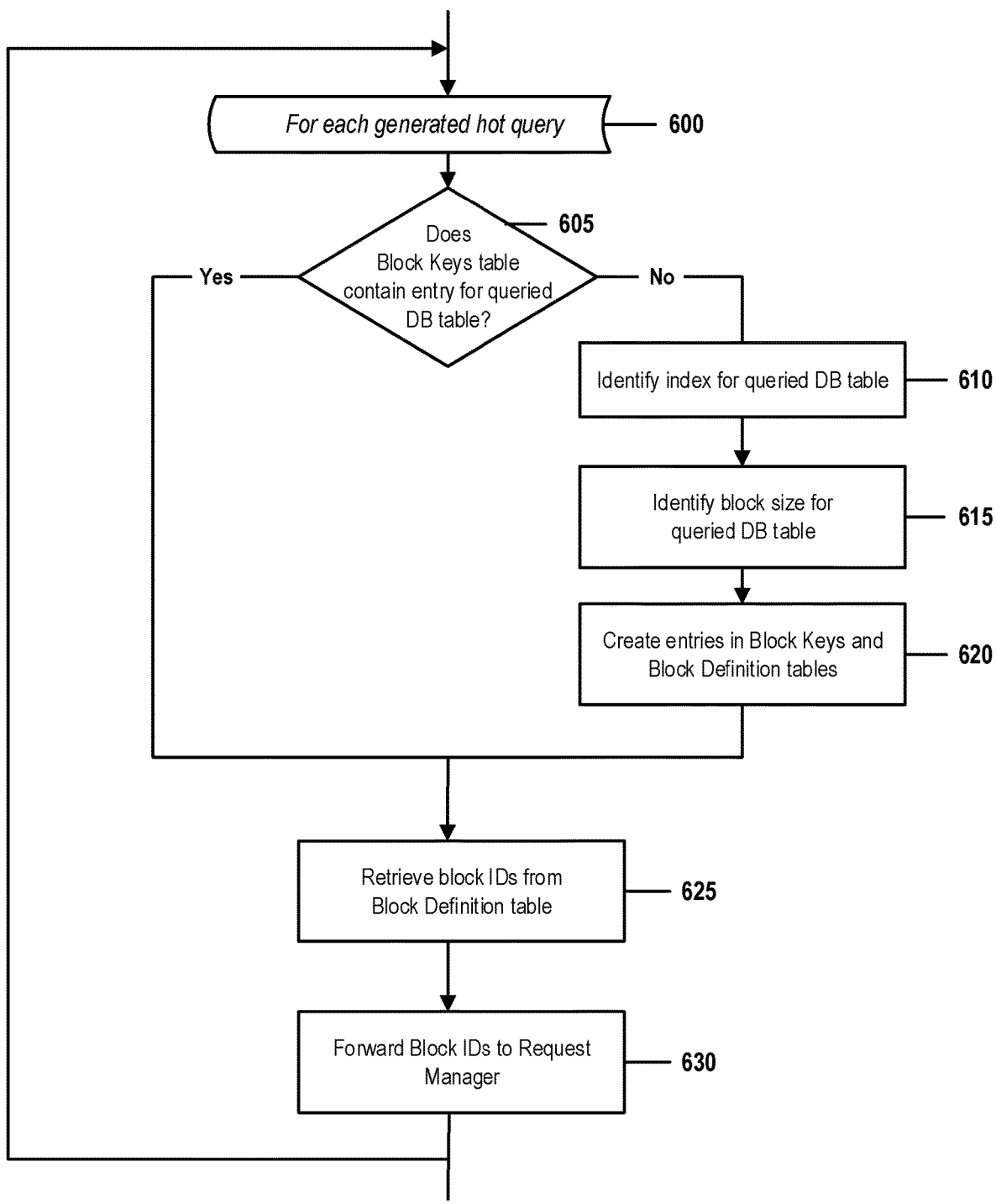
FIG. 6 is a flow chart that illustrates steps performed by a Block Mapper module of a data-replication system, in accordance with embodiments of the present invention.

FIG. 6 is a flow chart that illustrates steps performed by a Block Mapper 420 component of data-replication system 4000, in accordance with embodiments of the present invention. In these steps, Block Mapper 420 analyzes each SQL request sent by Request Manager 425 in step 530 of FIG. 5, then return the block IDs corresponding to that SQL and update the Block Definition table 460a and the Block Keys table 460b.

FIG. 6 contains steps 600-630.

Step 600 begins an iterative procedure of FIG. 6. This procedure is performed by Block Mapper 420 once for each "hot" query or request sent to Block Mapper 420 in step 720 by Request Manager module 425.

In step 605, Block Mapper 420 determines whether an entry for a table accessed by the current query already exists in Block Keys table 460b and, if so, determines whether the current query accesses the table with the indexing method specified by the entry. Each entry in Block Keys table 460b relates a database table of source database 400a with a "block key" identifier that specifies the indexing mechanism, such as a particular table index or key, that the replication system 4000 will use to access data stored in the corresponding database table.

If Block Mapper 420 determines in step 605 that no entry exists for the database table accessed by the current query, then Block Mapper 420 performs steps 610-620 to: i) identify the index and the block size of the queries table; ii) create an entry in the Block Definition table 460a that identifies characteristics of the newly defined blocks; and iii) add an entry to the Block Keys table that specifies an indexing method to be used by replication system 4000 to access the table when servicing the query. FIG. 4 shows examples Block Definition table 460a entries and Block Keys table 460b entries.

In step 610, Block Mapper 420 identifies the key or other indexing method to be used when accessing the database table accessed with the current query. This identification may be performed by any means known in the art, such as by querying database system tables that allow a database-management system to select a preferred indexing method when servicing an SQL query. If the query being processed in the current iteration of the method of FIG. 6 is an SQL query, certain embodiments of Block Mapper 420 in step 610 use a similar mechanism to select a preferred key or indexing method for the requested table.

In step 615, Block Mapper 420 identifies a block size that determines the size of the block identified by key or index selected in step 610. As in step 610, the block size may be selected by any means known in the art. For example, if database logs of the source database 400a, or the transaction logs of application 450, indicate that network performance degrades significantly during the transfer of data items larger than five megabytes, then the block size can be defined as 3 megabytes. Similarly, performance logs may indicate that system or application performance falls to an unacceptable level during periods of heavy utilization when the system is required to store memory-resident data objects larger than two hundred megabytes. In this example, the system would then respond by selecting a smaller block size that historical records indicate would not have as significant an effect on performance.

In step 620, Block Mapper 420 updates the Block Keys table 460b and the source-side Block Definition table 460a to create entries for new blocks that map to the data stored in the database table being accessed.

In certain embodiments, Block Mapper 420 in step 620 also directs replication system 4000 to create the memory-resident block identified by the newly created replication-table entries. In other embodiments, another module of replication system 4000 creates the memory-resident block upon detecting the new entries in the replication tables 460a, or upon receiving notice from Block Mapper 420 that the new entries have been created.

In step 625, Block Mapper 420 queries the Block Definition table 460a to retrieve block-definition data for all database tables required by the currently processed query. In one example, the query requests access to database tables TBL1 and TBL2. Block Mapper 420 responds by retrieving from Block Keys table 460b the indexes to be used to identify memory-resident blocks for TBL1 and TBL2. Block Mapper 420 then uses these indexes to retrieve entries for each block from Block Definition table 460a. In this example, TBL1 is stored in four memory-resident blocks and TBL2 is stored in sixteen memory resident blocks, so Block Mapper 420 retrieves entries for all 20 blocks from Block Definition table 460a. If entries had not existed in table 460a for either TBL1 or TBL2, Block Mapper 420 would have first created the necessary entries in both the Block Keys table 460b and the Block Definition table 460a.

In step 630, Block Mapper 420, after ensuring that the Block Definition table 460a and the Block Keys table 460b contain entries for all tables accessed by the currently processing query, forwards upon request the Block IDs of each entry to Request Manager 425.

Figure 7:
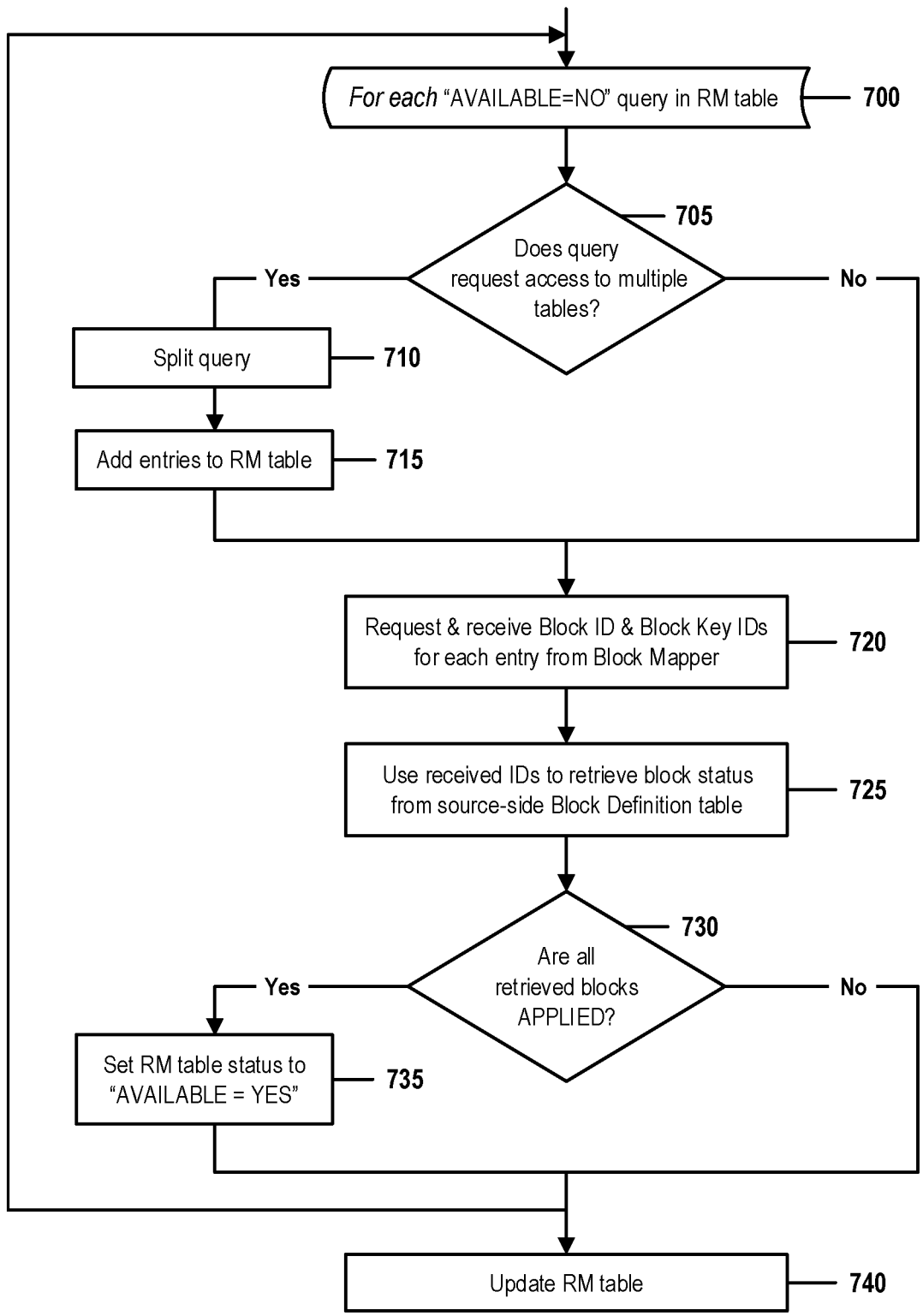
FIG. 7 is a flow chart that illustrates steps performed by a Request Manager module of a data-replication system, in accordance with embodiments of the present invention.

Request Manager 425 performs the next steps in the replication workflow, which are described in greater detail in FIG. 7.

FIG. 7 is a flow chart that illustrates steps performed by a Request Manager 425 module of data-replication system 4000, in accordance with embodiments of the present invention. FIG. 7 contains steps 700-740.

Request Manager 425, as its name implies, tracks and manages the status of the "hot" requests from source application 450a or target application 450b (including SQL queries submitted directly by users or forwarded by source application 450a or target application 450b) generated by the Pattern Discovery 415 module of replication system 4000 in step 525 of the method of FIG. 5. For example, if a request consists of an SQL query that contains a JOIN predicate or performs other operations that access multiple database tables, Request Manager 425 splits the query or request into subrequests that each request access to only one database table.

In particular, Request Manager 425 determines when a query has become "available" because all replication processes that affect the database tables that the query requests access to have been completed. Request Manager 425 also monitors, manages, and reports the availability of a query to users of the target database 400b, which occurs when all memory-resident blocks that store the contents of a table accessed by the query have been fully replicated to target database 400b.

Prior to the beginning of step 700 of FIG. 7, Resource Manager 425 determines whether a request attempts to access tables of target database 400b that are available for access by determining whether the query's corresponding entry in Request Manager ("RM") table 460c. If the entry specifies an availability status="YES," the method of FIG. 7 is not performed for that query and the query is forwarded directly to the target environment for application to target database 400b. The method of FIG. 7 is performed for all entries that, because they have not yet been fully applied to target database 400b, have an availability status="NO."

Step 700 begins an iterative procedure of steps 700-740, which is performed once for each generated request that is not currently available to use target database 400b. In each iteration of this iterative procedure, Request Manager 425 attempts to make such a request available by determining that all memory-resident blocks necessary to service that request have been successfully replicated (or "applied") to target database 400b. If all blocks for all accessed tables have been applied, Request Manager 425 reports that the query is now available to use target database 400b.

Request Manager 425 determines the availability status of each generated request by scanning the RM table 460c. Each entry of RM table 460c identifies the availability and other characteristics of a database table used by a particular request. For example, one entry of RM table 460c might identify that, when submitted at time 8:00 AM, generated query SQL004 retrieves from database table TBL004 records identified by values off a numeric index in the range of 97592 through 99432. The entry would also identify the memory resident blocks that temporarily store the contents of database table TBL004 while TBL004 is being replicated. The index used by the query to access database table TBL004 is identified by a relation to a corresponding record of Block Keys table 460b.

In this example, if query SQL004 also accesses a second database table TBL929, a second entry in RM table 460c would provide similar information for the combination of query SQL004, database table TBL929, and timestamp 8:00 AM. Similarly, if a second query SQL777 requires access to database table TBL004, or if a second instance of query SQL004, performed at time 1:00 PM accesses database table TBL004, an additional entry in the RM table 460c would provide information about the SQL777/TBL929/8:00 or about the SQL004/TBL004/13:00 query/table/time combination.

Therefore, at the outset of the iterative procedure of FIG. 7, Request Manager 425 will have retrieved from RM table 460c a list of all tables required by those of the queries received from the Pattern Discovery module 415 or user application 450 that are not yet fully replicated to target database 400b and currently available to use target database 400b.

In step 705, Request Manager 425 parses the current query to determine whether the query requests access to more than one database table. This may occur, for example, when the query contains an SQL JOIN predicate that requests a database to retrieve or merge data items retrieved from two database tables.

Request Manager 425 performs step 710 if determining that the query requests access to more than one database table in step 705. In step 710, Request Manager 425 splits the query into two or more subrequests that each request access to one database table. Otherwise, the method of FIG. 7 continues with step 715.

The steps of parsing the current query and splitting a query into subrequests may be performed by any means known in the art. In some embodiments, the query is parsed by a conventional relational-database query-processing front-end, or the query is split through a known parsing algorithm or an artificially intelligent method of semantic analytics.

For example, a current request is the SQL query:
SELECT 'xxx' from TBL1, TBL2
    WHERE TBL1.id=TBL2.id and TBL1.id<1000 and
        TBL1.name >'A' could be parsed into the two statements:
SELECT 'xxx' from TBL1 WHERE id<1000
and
SELECT 'xxx' from TBL2 WHERE id<1000 and name >'A'.

In step 715, Request Manager 425 updates the RM table 460c by adding one or more entries for the newly created subrequests. Each of the newly added entries describes a subrequest that is a combination of the current query, the timestamp of the current query, and the single database table accessed by the described subrequest. As with all entries in the RM table 460c, the newly added entries each contain columns that will be filled with data identifying the subrequest's relative priority, the Block IDs of the memory-resident blocks that contain data stored by the database table accessed by the subrequest, the Block Key ID of the index used by the replication system 4000 to access the database table (as identified by Pattern Discovery module 415), and a status flag that indicates whether the subrequest portion of the current query is currently available to use target database 400b.

In step 720, Request Manager 425 requests and receives the Block ID and Block Key ID for each block identified by the entry or entries of RM table 460c for the current request and its subrequests, if any.

In step 725, Request Manager 425 uses Block ID and Block Key ID received in step 720 to retrieve the status of each corresponding block of the database table from Block Definition table 460a. In certain embodiments, this status may assume any of five values:

Init: indicates that a memory-resident block has been created and loaded with refresh data, but has not been updated with mirror or incremental data;

Waiting: indicates that incremental data has been loaded into the memory-resident block, and that the block has not yet been transmitted to the target system for replication;

Sending: indicates that the contents of the memory-resident block is being transmitted to the target system;

Sent: indicates that the block has been transmitted to the target system, but the contents of that block have not yet been replicated to target database 400b;

Applied: indicates that the contents of the memory-resident block have been successfully replicated to target database 400b.

In some embodiments, if desired by an implementer, these status labels may be replaced by equivalent labels. In other embodiments, additional values may be used to indicate possible status states of a table, block, or query that are not precisely specified by any of the five possible status states listed above.

For example, in certain embodiments and examples presented in this document, a "Sending" status would indicate that the contents of a source-side memory-resident block are in the process of being transmitted from a source system or operating environment to a target system or operating environment. At the completion of this transmission process, the block's status would then be updated to "Sent."

In step 730, Request Manager 425 determines whether all blocks that contain information stored in each table identified in the previous steps of the method of FIG. 7 have an "Applied" status, indicating that those blocks have already been replicated to target database 400b. If so, Request Manager 425 performs step 735.

In step 735, Request Manager 425 sets the "Available" status of each entry in the RM table 460c associated with the current request to "YES" if every block comprised by the table identified in that entry is identified by the Block Definition table 460a as being "Applied." The Request Manager 425 will then begin forwarding all future queries requesting access to the database tables currently being processed to the target environment for normal application to target database 450b.

In one example, Request Manager 425 creates the following entry in RM table 460c:

| Priority | Table | Query/Req | TimeStamp | Block IDs | Blk Key ID | Available? |
|---|---|---|---|---|---|---|
| 1 | TBL1 | SQL004 | 08:00 | 1, 3 | EID | |

If Request Manager 425 determines from the Block Definition table 460a that memory-resident blocks 1 and 3 both have "Applied" status—that is, that all blocks of TBL1 have been successfully replicated to target database 400b— then Request Manager 425 in step 735 sets the "Available" status in this entry to "YES." In other words: i) if the current request SQL004 is an SQL query that accesses only database TBL1; ii) if the contents of TBL1 have been stored and updated in memory-resident blocks 1 and 3; and iii) if memory-resident blocks 1 and 3 have been replicated to target database 400b; then query SQL004 is now once again available to use target application 450b.

In step 740, Request Manager 425 updates the information in the entries of RM table 460c that correspond to the current request. If the current request has been split into a set of subrequests, the existing entry for the current request in the RM table 460c is replaced by an entry for each subrequest, as described above. Request Manager 425 inserts into these entries of the RM table 460c any block, block key, status, or other identifiers selected or retrieved in prior steps of the method of FIG. 7. If Request Manager 425 determines in step 730 that at least part of the contents of a table are contained in a memory-resident block that has not yet been applied to target database 400b, then the RM-table's "Available" status of a request or subrequest that attempts to access that table is set to "NO."

At the conclusion of the method of Step 7, Request Manager 425 will have:

i) confirmed that each hot request generated by Pattern Discovery module 415 in the method of FIG. 5 or user application 450 attempts to access only one database table of source database 400a or target database 400b;

ii) ensured that each single-table request is described by one entry in RM table 460c; and iii) marked as "available" any request that attempts to access only database tables that contain only data that has already been replicated (or "applied") to target database 400b.

Figure 8:
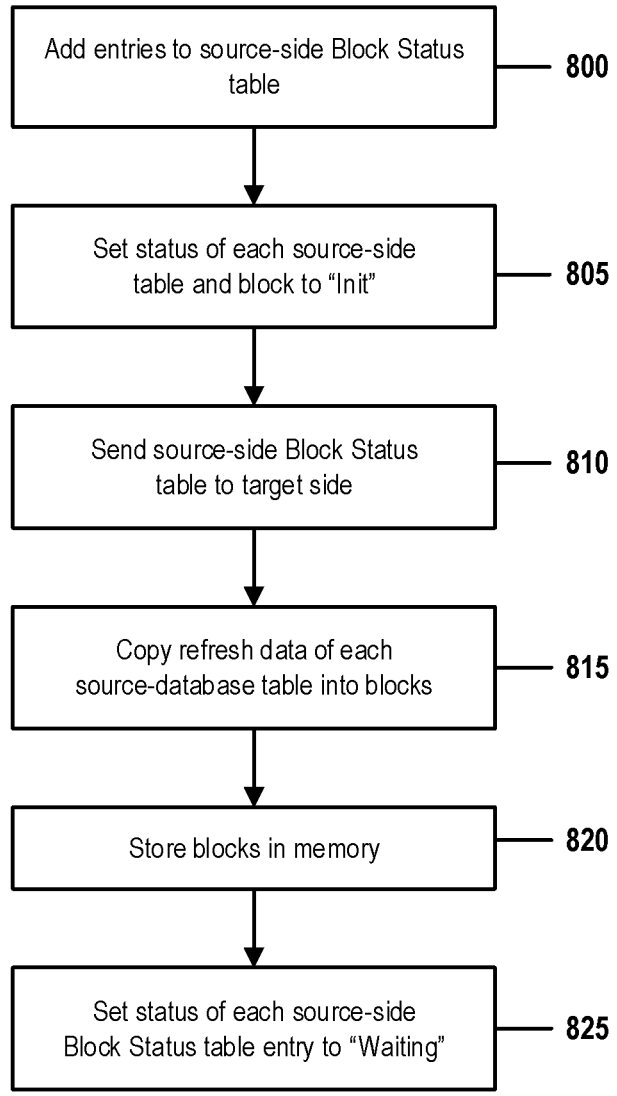
FIG. 8 is a flow chart that illustrates a data-refresh procedure performed by a Reader/Source-Merger module of a data-replication system, in accordance with embodiments of the present invention.

FIG. 8 is a flow chart that illustrates a refresh procedure performed by Reader/Source-Merger module 430 ("Source Merger 430") of data-replication system 4000, in accordance with embodiments of the present invention. FIG. 8 contains steps 800-825.

The procedure of FIG. 8 is performed once each time that data-replication system 4000 performs a replication task. Depending on embodiment details, the procedure of FIG. 8 could be performed at the outset of the replication task or could be performed at an implementer-preferred time that occurs after the division of each table of source database 400a into blocks, but before those tables have been copied into the blocks. In all cases, regardless of the exact sequence implemented in a particular embodiment, all steps shown in FIG. 8 are performed prior to the transfer of any block content to the target environment.

In step 800, Source Merger 430 maintains the Status of each entries in the source-side Block Definition Table. Each entry maintained by Source Merger 430 describes the Availability status of one data block of the source database 400a.

In some embodiments, data contained a source-side Block Definition table 460a can substitute for RM table 460c, since Block Definition table 460a contains at least the basic data items required by a RM table 460c:
- an identifier of a database table to be replicated;
- a priority assigned by the Pattern Discovery module 415 to the database table;
- a request or query that requests access to the database table;
- a timestamp that associates the request or query with a particular time or date;
- identifiers of the memory-resident blocks that will store the contents of the database table during the replication process; and
- a status flag that indicates whether the request or query is "Available" to be submitted by users of the target database 400b.

One example of an entry in the source-side Block Definition table might be:

| Priority | Table | Query/Req | TimeStamp | Block IDs | Status |
|---|---|---|---|---|---|
| 1 | TBL1 | SQL004 | 08:00 | 1, 3 | |

Note that, except for Available/Status column, this entry is identical to the exemplary entry of RM table 460c described in step 735 of FIG. 7. Regardless of whether an embodiment tracks and maintains the above information in a distinct source-side Block Status table or merely tracks similar data contained in RM table 460c, the source-side Block Status table must contain at least the six columns of data enumerated above.

In step 805, Source Merger 430 sets the status of each block of each table of source database 400b to "Init." These status settings, in some embodiments, may be stored by the replication system 4000 in any format desired by an implementer. Certain embodiments may be configured to omit the express performance of this step, instead incorporating a configuration setting that creates every new entry in either the source-side Block Status table or the target-side Block Status table with an initial default value of "Init," indicating that the memory-resident blocks identified by either Block Status table have not yet been subject to either refresh or mirroring operations.

In step 810, Source Merger 430 sends the entire source-side Block Definition table to the target environment. In some embodiments, this sending is performed by directing the Sender module 435 to send the relevant data to the Receiver module 440. All entries in the resulting target-side Block Definition table 460d will comprise a Status value of "Init."

The information contained in the resulting target-side Block Definition table 460d can vary, according to an implementer's preferences, but in all cases, target Block Definition table 460d must contain at least the columns shown in FIG. 4. The information stored in all but one of the columns can be gathered from any source-side replication tables 460a-460c that have already been populated or from the source-side Block Definition table.

In step 815, Source Merger 430 copies each database table to be replicated from source database 400a to corresponding blocks identified in the Block Definition table 460a. In embodiments that have structured the source Block Definition table accordingly, Source Merger 430 may use information stored in the source-side Block Definition table to identify which sets of blocks store the contents of each table.

In some embodiments, the corresponding blocks reside in a data repository, such as a disk drive or solid-state storage device. In other embodiments, the corresponding blocks are stored in computer memory allocated to the replication system 4000. In the latter case, the method of FIG. 8 omits what would be a redundant step 820.

In step 820, if necessary, Source Merger 430 loads each corresponding block currently residing in a data repository into memory for further processing.

In step 825, Source Merger 430 sets the Status value of each memory-resident block's entry in the source-side Block Definition table to "Waiting." This indicates that each block has been allocated space in memory and has been loaded with refresh data, but is not yet ready to send to the target environment.

The method of FIG. 9 describes steps by which Source Merger module 430 subsequently performs a mirror operation to update some or all of the memory-resident blocks with incremental data.

Figure 9:
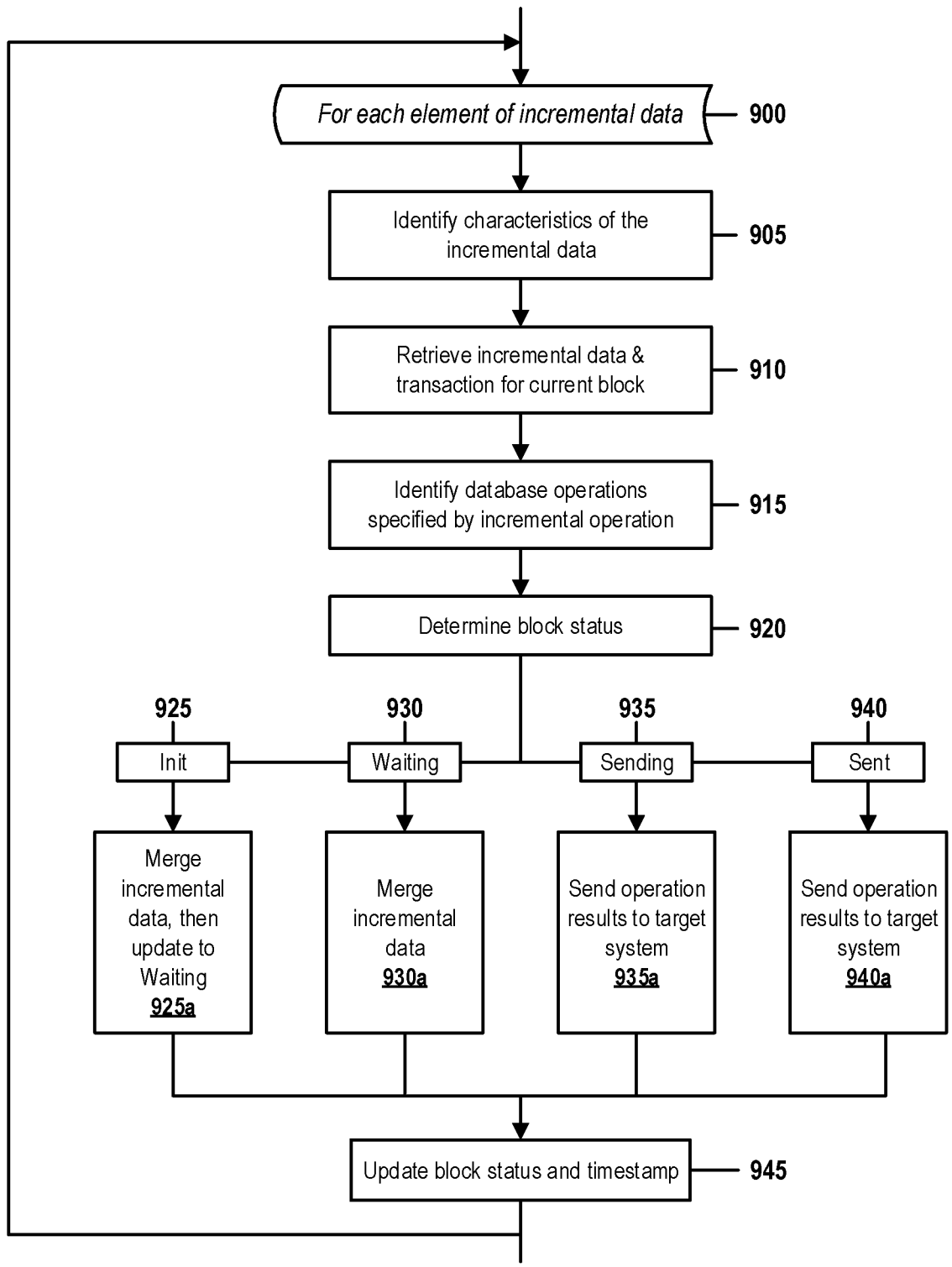
FIG. 9 is a flow chart that illustrates a data-mirroring procedure performed by a Reader/Source-Merger module of a data-replication system to merge incoming incremental mirror data into memory-resident blocks, in accordance with embodiments of the present invention.

FIG. 9 is a flow chart that illustrates a data-mirroring procedure performed by the Reader/Source-Merger module 430 ("Source Merger 430") of data-replication system 4000, in accordance with embodiments of the present invention. FIG. 9 contains steps 900-945.

Step 900 begins an iterative procedure that is performed by the Source Merger 430 module once for each element of incremental "mirror" data. The "mirror" data contains data changes to the table in source database 400a.

Each performance of the method of FIG. 9 comprises a set of iterations of the iterative procedure of steps 900-945 that together match the incremental "mirror" data with the memory-resident block, determine the status of each memory-resident block and then perform a responsive action that is determined as a function of that block's status. During a replication effort, embodiments repeat the entire method of FIG. 9 periodically or continuously until all memory-resident blocks have been sent to the target environment for replication to target database 400b.

In step 905, Source Merger 430 identifies characteristics of the incremental "mirror" data being processed by the current iteration of steps 900-945. In some embodiments, these identifications are made solely by parsing the database log.

In one example, the current iteration of steps 900-940 is processing incremental "mirror" data of a "Customer.Address" database table of source database 400a. The operation and value for each columns of "Customer.Address" could be found in the incremental "mirror" data. The Block Keys table 460b specifies that replication system 4000 uses a "Yr" key or index to access data contained in this database table on "Year" columns. The value of "Year" columns in the incremental "mirror" data is 2500. Source-side Block Definition table 460a specifies that Block #2 of database table "Customer.Address" contains data stored in a "Year" columns of the "Customer.Address" database table that span a range of values 2000-3000 and that correspond to queries submitted from 1:00 PM through 5:00 PM Eastern Standard time on Friday afternoons. So this incremental "mirror" data matches the Block #2 of database table "Customer.Address".

In step 910, Source Merger 430 retrieves or identifies incremental "mirror" data that has not yet been merged into the block being processed. Source Merger 430 may identify this data by any means known in the art, such as by referring to transaction log of source database 400a that lists all transactions marked with timestamps between the start times of the previous and current replication tasks. Each such transaction would at least direct a source application 450a to perform a particular operation be on a column of a particular database table and may reference a particular range of key values. In some embodiments, Source Merger 430 considers only transactions directed to source application 450a.

In step 915, Source Merger 430 identifies the result of one or more database operations that must be performed in order to implement the logged transaction. This identification may be performed by means known in the art in order to identify common database transactions such as inserting or deleting a record, updating a value stored in a column, or updating a key value.

In step 920, Source Merger 430 determines the status of the memory-resident block currently being processed. In some embodiments, Source Merger 430 merely retrieves the status of the current block identified in the Block Definition table 460a.

Case statement 925-940 identify four possible courses of action, that each correspond to one of four possible source-side block-status values determined in step 920. In embodiments that allow more than four possible source-side block-status values, or that incorporate block-status values other than the four shown in 925-940, the case statement will consist of one branch for each status value defined by the embodiment.

For example, if Source Merger 430 determined in step 920 that the status of the current block is "Init," indicating that the block contains only initial refresh data, then Source Merger 430 performs step 925a by: i) performing any further updates to the memory-resident block to incorporate revisions to the block made by the database operation identified in step 915; and ii) update the status of the current block in the Block Definition table 460a to "Waiting," which indicates that a module of replication system 4000 has completed the process of merging incremental mirror data into the block.

Similarly, if Source Merger 430 determined in step 920 that the status of the current block is "Waiting," Source Merger 430 performs step 930a by performing any further updates to the memory-resident block to incorporate revisions to the block made by the database operation identified in step 915.

If Source Merger 430 determined in step 920 that the status of the current block is "Sending" or "Sent," Source Merger 430 performs, respectively, step 935a or 940a to transmit to the target-side components any revisions to the data that were made by the database operation identified in step 915. In some embodiments, this transmission consists of or comprises sending only the incremental revisions to the target-side components, allowing the target-side components to determine how to update the target-side memory-resident block. In other embodiments, the transmission consists of sending an updated version of the entire block, including all revisions necessitated by the operations.

In some embodiments, Source Merger 430 cannot perform this step once the block status has been updated to "Applied," which indicates that the block previously sent to the target environment has already been written to target database 400b. In other embodiments, additional branches of case statement 925-940 allow Source Merger 430 to perform this step even when the block status is "Applied" or "Applying." In this latter case, the target-side components of replication system 4000 will apply the newly sent block to target database 400b, replacing the previously applied data. The target database table being updated will once again be made unavailable to users of target database 400b until this second applying step is completed.

In step 945, Source Merger 430 completes any remaining bookkeeping operations, such as updating the status of the current block in the Block Definition table 460a to account for the performance of a step 925a-940a, or adjusting a timestamp of the current block in the Block Definition table 460a.

In some embodiments, the time specified by the RM table 460c is distinct from the timestamp of the Block Definition table 460a. The former is a time associated with each hot query or request identified by an entry of RM table 460c, while the timestamp of the Block Definition table 460a identifies a time at which a status of a memory-resident block was last updated.

Figure 10:
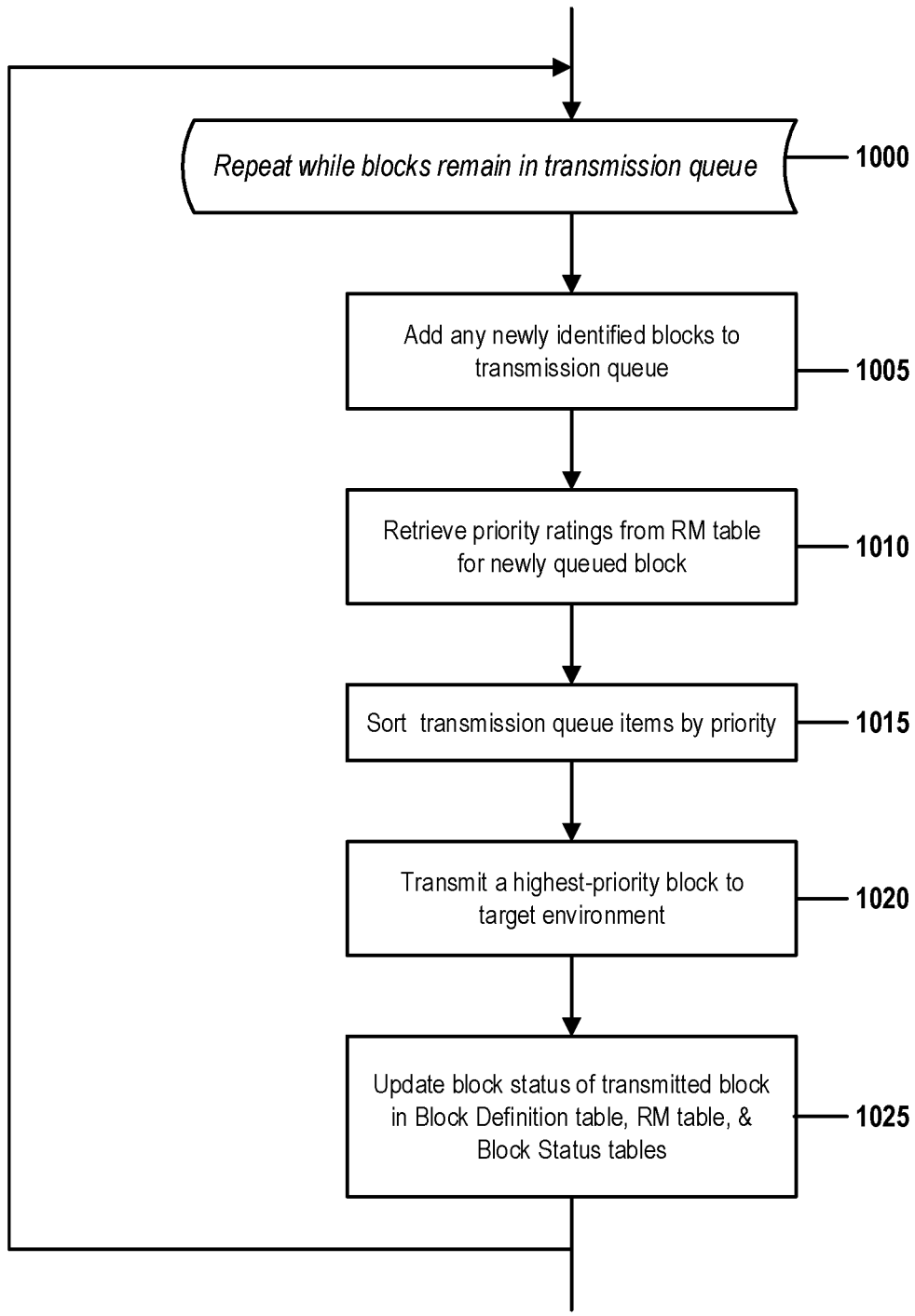
FIG. 10 is a flow chart that illustrates a data-transmission procedure performed by the Sender module of data-replication system, in accordance with embodiments of the present invention.

In all embodiments, any step that comprises Source Merger 430 module transmitting data from the source environment to a target-side component, or to any other module residing in the target environment, is performed by forwarding the data to a Sender 435 component of replication system 4000, which then, as described in subsequent figures and in FIG. 4, transmits the data to a Receiver 440 component that resides in the target environment. When Sender 435 has received FIG. 10 is a flow chart that illustrates a data-transmission procedure performed by the Sender module 435 of data-replication system 4000, in accordance with embodiments of the present invention. FIG. 10 shows steps 1000-1025.

Step 1000 begins an iterative procedure that is performed by Sender 435 whenever memory-resident blocks await transfer from the source environment containing source database 400a to the target environment containing target database 400b. These blocks may have been identified to Sender 435 by Source Merger 430, or another module of replication system 4000, through a procedure like the method of FIG. 9.

In step 1005, Sender 435 adds any newly identified blocks to the existing transmission queue.

In step 1010, Sender 435 retrieves a priority value of each newly added block from Block Definition table 460a, which specifies a priority for each memory-resident block, rather than a single priority for all blocks that contain data stored in a particular database table.

In step 1015, Sender 435 resorts the queue, if necessary, such that the blocks are listed in the queue in order of priority.

In step 1020, Sender 435 transmits the highest-priority queued block to the Receiver 440 module of data-replication system 4000, which is located in the target environment. In some embodiments, when multiple queued blocks have the same priority, any other method preferred by an implementer may be used to select a particular block of the highest-priority blocks.

In step 1025, Sender 435 updates the status of the transmitted block in the source-side Block Definition table 460a. In some embodiments, Receiver 440 also directs Sender 435 to update the status of the source-side Block Definition table accordingly, but in other embodiments, Receiver 440 autonomously updates all relevant status fields of target-side replication tables.

In some embodiments, the transmitted block's status values are updated to "Sending" while the block is being transmitted to Receiver 440. Once the transmission is complete, each status value associated with the transmitted block is updated to a "Sent" status.

In certain embodiments, Receiver 440 module of replication system 4000, upon receipt of the transmitted block in the target environment, updates target-side replication tables that are analogous to similar source-side tables. For example, in certain embodiments, upon receiving a block from Sender 440 and forwarding the received block to the Applier/Target Merger 445 ("Applier 445") module of replication system 4000, Receiver 440 might update the status values stored in target-side Block Definition table 460d to "Received," or might update those status values to "Applied" upon being notified that Applier 445 has finished storing (or "Waiting") the transmitted block to target database 400b. In other embodiments, some or all of these status updates are performed by Applier 445.

Figure 11:
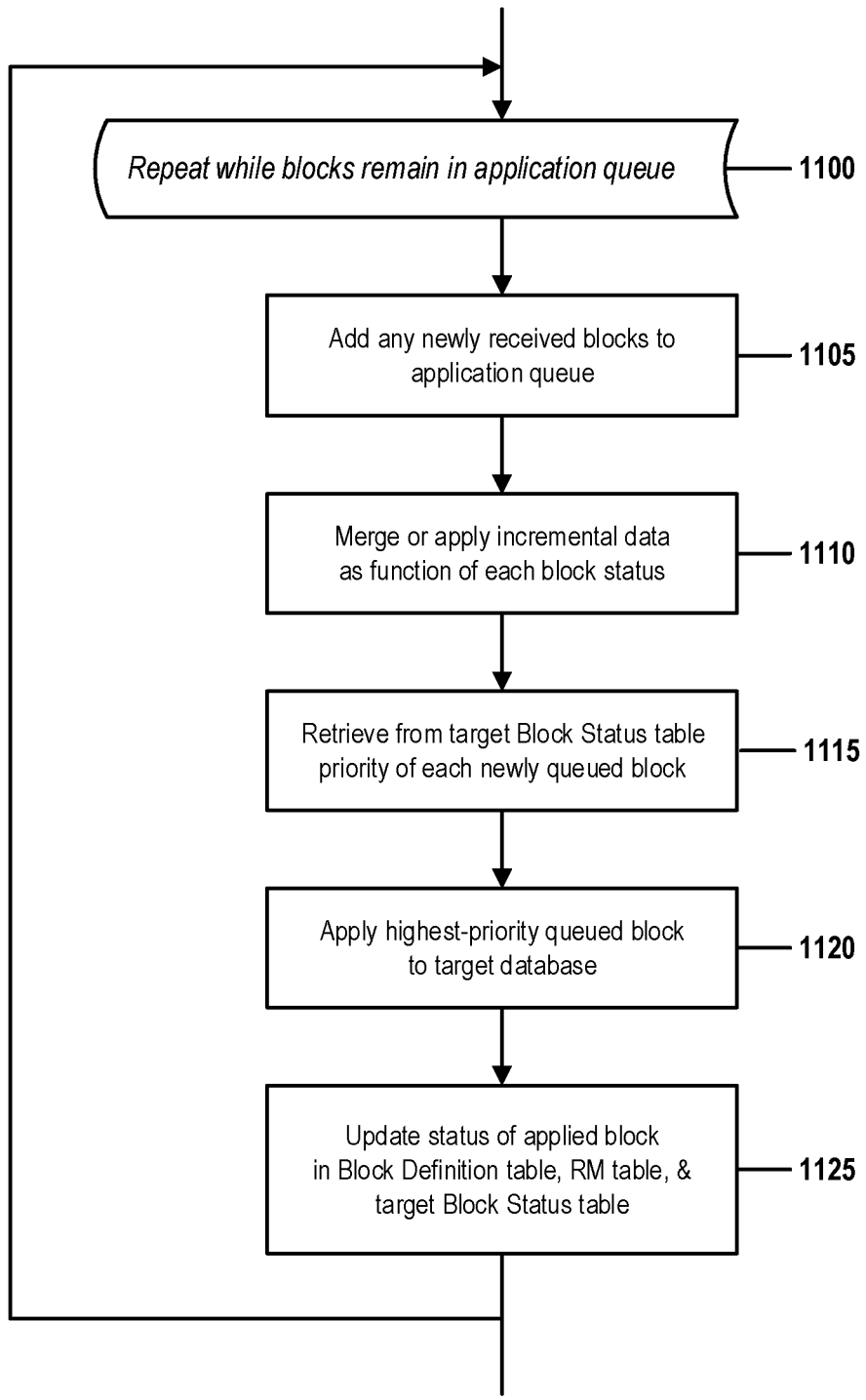
FIG. 11 is a flow chart that illustrates a data-mirroring procedure performed by the Applier/Target Merger module of data-replication system, in accordance with embodiments of the present invention.

FIG. 11 is a flow chart that illustrates a data-mirroring procedure performed by the Applier/Target Merger 445 ("Applier") module of data-replication system, in accordance with embodiments of the present invention. FIG. 11 contains steps 1100-1125.

Step 1100 begins an iterative procedure that is performed by target-side Applier 445 whenever memory-resident blocks remain in a target-side application queue awaiting application to target database 400b. Depending on embodiment, blocks are continuously received by the target-side Receiver 440 module from the source-side Sender 435 module, and then forwarded by Receiver 440 to the application queue or to Applier 445. Each transmitted block contains a subset of data that is ready to be stored, or "applied," to a database table of target database 400b.

In step 1105, Applier 445 adds any newly received blocks to the application queue, if those blocks are not already contained in the application queue.

In step 1110, Applier 445 determines whether any incremental data should be merged into each target-side memory-resident block being processed or applied directly to a corresponding database table of target database 400b. Applier then performs any identified mergers or applications. This procedure includes the steps:

i) identifying each memory-resident block that is affected by each incremental transaction;

ii) identifying each operation, such as an insert, delete, or non-key update operation, to be performed on the affected blocks;

iii) determining the current status of each affected blocks from corresponding entries in target-side Block Definition table 460d; and iv) performing an appropriate merger/application action as a function of the current status:

if a block's current status is "Waiting," merge the incremental data into the refresh data already contained in the block;

if a block's current status is "Applying," wait for the block's status to change to "Applied"; and if a block's current status is "Applied," merge the incremental data directly into the target database table that contains the current block; and v) update the timestamps target-side Block Definition table 460d for each affected memory-resident block to record the time at which each block was last updated.

In step 1115, Applier 445 retrieves a priority value of each newly added block from target-side Block Definition table 460d or any other target-side replication table that stores block priority values. If desired by an implementer, Applier 445 may also in this step sort the application queue to ensure that the blocks are listed in priority order.

In step 1120, Applier 445 stores or applies the highest-priority queued block to the target database 400b. In some embodiments, when multiple queued blocks have the same priority, any other method preferred by an implementer may be used to select a particular block of the highest-priority blocks.

In step 1125, Applier 445 updates all Status values of the block stored in target-side replication tables to "Applying." Depending on implementer preference, Applier 445 may also directly or indirectly notify source-side modules of replication system 4000 that the block is being applied, such that one or more source-side modules may similarly update that block's status in source-side replication tables. At the conclusion of the application procedure, any "Applying" status values associated with the block are similarly updated to a status of "Applied."

Depending on implementer preference, Applier 445 may also directly or indirectly notify source-side modules of replication system 4000 that the block has been applied.

In some embodiments, Sender 435 and Receiver 440 forward to Applier 445 memory-resident blocks that contain refresh data, and then send incremental mirror data separately. In such cases, Applier 445 performs for each forwarded block a method analogous to that of FIG. 9. This analogous method includes steps of receiving mirror data from source-side components of replication system 4000; identifying the results of database operations specified by mirror-data transactions; determining the current status of the forwarded block; and then performing steps that are chosen as a function of that status.

In one example, if the current status of the forwarded block is "Waiting," the incremental data, including the results of operations specified by the mirror transactions, is merged with refresh data already contained in the forwarded block. If the status is "Applying," Applier 445 does not attempt to revise the forwarded block while the block is in the process of being stored in target database 400b. And if the status is "Applied," indicating that at least the refresh data has been fully applied to database 400b, Applier 445 updates the stored block with the incremental, mirror data. At the conclusion of this procedure, Applier 445 may update the timestamps of the forwarded block in each corresponding target-side replication table to record the time at which that block's status last changed.

The entire procedure described by FIGS. 4-11 is summarized in the following example. A banking business maintains critical enterprise applications that access large data repositories. Data stored in these repositories must be replicated from time to time to other repositories for reasons such as ensuring the integrity of the data should a catastrophic event occur. At 7:00 AM each day, the bank's head office audits financial data received during the previous 24 hours from all branches nationwide. Because receiving and processing such a large amount of data can require significant network bandwidth and a large number of simultaneous connections, the bank diverts a portion of the workload, including some query-processing tasks, to a secondary data center to maintain workflow.

This requires the primary and secondary data centers to ensure synchronize their respective repositories. The primary and secondary data centers' data-processing applications and the secondary data center's data-processing application initiate a replication job that replicates the primary data center's repository of received financial data to the secondary data center's repository every night at 1:00 AM.

On days when an especially large number of transactions must be processed, the resulting lengthy replication times make the secondary repository unavailable for an unacceptable length of time. If the replication job is not completed by 7:00 AM the secondary data center's query system is unable to process user queries during business hours until the two repositories are eventually resynchronized by the completion of the replication job.

Embodiments of the present invention address this problem with an improved replication system that infers patterns from which the embodiment can assign a priority to each city from which financial data is received. The embodiment can then, using systems and methods described in this document, identify a most efficient way to replicate data as a function of these patterns and priorities.

For example, if an embodiment detects a regular pattern in the received data from which can be inferred that the most critical, or most often accessed, data is generally received from four particular cities, the embodiment may respond by scheduling the replication of data received from those cities to be performed prior to the replication of data received from other cities. This approach makes the most frequently accessed database tables and most frequently submitted queries available to users and applications available more quickly, and before completion of the entire business-spanning replication job.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A data-replication system comprising a processor, a memory coupled to the processor, and a computer-readable hardware storage device coupled to the processor, the storage device containing program code configured to be run by the processor via the memory to implement a method for increased data availability during replication of a source database operating in a source computing environment to a target database operating in a target computing environment, the method comprising:
   notifying a target application that accesses the target database that the target database is temporarily unavailable for access by users of the application;
   identifying a set of hot queries, where a hot query is a query that is submitted to the source database at a rate exceeding a threshold submission rate;
   copying a first set of refresh data from a first database table of the source database to a first set of memory-resident blocks, where the first database table is referenced by a first query of the hot queries;
   updating the contents of the first set of memory-resident blocks with a first set of incremental data;
   transmitting each block of the updated first set of memory-resident blocks to the target computing environment upon the completion of the updating of the each block;
   determining that all blocks of the updated first set of memory-resident blocks have been copied to the target database; and
   notifying the source application that an instance of the first database table in the target database has become available for access by users of the source application.

2. The system of claim 1, where the data-replication system comprises seven functional modules:
   a Pattern Discovery module that identifies and prioritizes queries that qualify as being hot at particular times of day;
   a Block Mapper module that selects which subset of the first set of refresh data should be copied to each block of the first set of memory-resident blocks;
   a Request Manager module that, in response to a determination that a first hot query of the set of hot queries requests access to two or more database tables of the source database, splits the first hot query into two or more hot queries that each request access to only one database table of the source database;
   a Source Merger module that merges the first set of incremental data with the copy of the first set of refresh data stored in the first set of memory-resident blocks;
   a Sender module, operating in the source computing environment, that transmits an updated block of the updated first set of memory-resident blocks to a Receiver module, operating in the target computing environment, when the Sender module determines that the updated block contains refresh data that has been updated with incremental data by the Source Merger module, and where the first set of memory-resident blocks are transmitted in an order that is determined by a priority assigned to each block by the Pattern Discovery module;
   the Receiver module, operating in the target computing environment, which receives each memory-resident block transmitted, by the Sender module, from the source computing environment to the target computing environment; and
   a Target Merger module that copies each memory-resident block received by the Receiver module to the target database.

3. The system of claim 1,
   where the first set of refresh data is data stored in the first database table that had previously been replicated to the target database during a most-recent previous data-replication job; and
   where the first set of incremental data is data stored in the first database table that had not been replicated to the target database during the most-recent previous data-replication job.

4. The system of claim 1, where the data-replication system tracks the status of each memory-resident block by maintaining a set of data-replication configuration tables.

5. The system of claim 1, where the first set of incremental data is a set of revisions to the first set of refresh data, where a first revision of the first set of incremental data is a revision to the first database table produced by a transaction submitted by a user after a performance of a most-recent previous data-replication job.

6. The system of claim 2,
   where the Pattern Discovery module is trained to infer data-access patterns from timestamped historical records of access requests previously submitted to the database,
   where the training enables the Pattern Discovery module to intelligently identify, as a function of the inferred patterns, which user-submitted queries should be classified as being hot queries at particular times of day or days of the week, where the training further enables the Pattern Discovery module to intelligently assign a priority to each query of the set of hot queries as a function of the inferred patterns, and where the Pattern Discovery module determines an order in which fully updated memory-resident blocks are transmitted to the target computing environment as a function of the assigned priorities.

7. The system of claim 1, where each hot query of the set of hot queries is a Structured Query Language (SQL) database query.

8. A method for increased data availability during replication of a source database operating in a source computing environment to a target database operating in a target computing environment, the method comprising:

a data-replication system notifying a target application that accesses the target database that the target database is temporarily unavailable for access by users of the source application;

the data-replication system identifying a set of hot queries, where a hot query is a query that is submitted to the source database at a rate exceeding a threshold submission rate;

the data-replication system copying a first set of refresh data from a first database table of the source database to a first set of memory-resident blocks, where the first database table is referenced by a first query of the hot queries;

the data-replication system updating the contents of the first set of memory-resident blocks with a first set of incremental data;

the data-replication system transmitting each block of the updated first set of memory-resident blocks to the target computing environment upon the completion of the updating of the each block;

determining that all blocks of the updated first set of memory-resident blocks have been copied the data-replication system to the target database; and the data-replication system further notifying the source application that an instance of the first database table in the target database has become available for access by users of the source application.

9. The method of claim 8, where the data-replication system comprises seven functional modules:

a Pattern Discovery module that identifies and prioritizes queries that qualify as being hot at particular times of day;

a Block Mapper module that selects which subset of the first set of refresh data should be copied to each block of the first set of memory-resident blocks;

a Request Manager module that, in response to a determination that a first hot query of the set of hot queries requests access to two or more database tables of the target database, splits the first hot query into two or more hot queries that each request access to only one database table of the target database;

a Source Merger module that merges the first set of incremental data with the copy of the first set of refresh data stored in the first set of memory-resident blocks;

a Sender module, operating in the source computing environment, that transmits an updated block of the updated first set of memory-resident blocks to a Receiver module, operating in the target computing environment, when the Sender module determines that the updated block contains refresh data that has been updated with incremental data by the Source Merger module, and where the first set of memory-resident blocks are transmitted in an order that is determined by a priority assigned to each block by the Pattern Discovery module;

the Receiver module, operating in the target computing environment, which receives each memory-resident block transmitted, by the Sender module, from the source computing environment to the target computing environment; and a Target Merger module that copies each memory-resident block received by the Receiver module to the target database.

10. The method of claim 8, where the first set of refresh data is data stored in the first database table that had previously been replicated to the target database during a most-recent previous data-replication job; and where the first set of incremental data is data stored in the first database table that had not been replicated to the target database during the most-recent previous data-replication job.

11. The method of claim 8, where the data-replication system tracks the status of each memory-resident block by maintaining a set of data-replication configuration tables.

12. The method of claim 8, where the first set of incremental data is a set of revisions to the first set of refresh data, where a first revision of the first set of incremental data is a revision to the first database table produced by a transaction submitted by a user after a performance of a most-recent previous data-replication job.

13. The method of claim 9, where the Pattern Discovery module is trained to infer data-access patterns from timestamped historical records of access requests previously submitted to the database, where the training enables the Pattern Discovery module to intelligently identify, as a function of the inferred patterns, which user-submitted queries should be classified as being hot queries at particular times of day or days of the week, where the training further enables the Pattern Discovery module to intelligently assign a priority to each query of the set of hot queries as a function of the inferred patterns, and where the Pattern Discovery module determines an order in which fully updated memory-resident blocks are transmitted to the target computing environment as a function of the assigned priorities.

14. The method of claim 8, further comprising providing at least one support service for at least one of creating, integrating, hosting, maintaining, and deploying computer-readable program code in the computer system, wherein the computer-readable program code in combination with the computer system is configured to implement the notifying, the identifying, the copying, the updating, the transmitting, the determining, and the further notifying.

15. A computer program product, comprising a computer-readable hardware storage device having a computer-readable program code stored therein, the program code configured to be executed by a data-replication system comprising a processor, a memory coupled to the processor, and a computer-readable hardware storage device coupled to the processor, the storage device containing program code configured to be run by the processor via the memory to implement a method for increased data availability during replication of a source database operating in a source computing environment to a target database operating in a target computing environment, the method comprising:

notifying a source application that accesses the target database that the target database is temporarily unavailable for access by users of the source application;

identifying a set of hot queries, where a hot query is a query that is submitted to the source database at a rate exceeding a threshold submission rate;

copying a first set of refresh data from a first database table of the source database to a first set of memory-resident blocks, where the first database table is referenced by a first query of the hot queries;

updating the contents of the first set of memory-resident blocks with a first set of incremental data;

transmitting each block of the updated first set of memory-resident blocks to the target computing environment upon the completion of the updating of the each block;

determining that all blocks of the updated first set of memory-resident blocks have been copied to the target database; and notifying the source application that an instance of the first database table in the target database has become available for access by users of the source application.

16. The computer program product of claim 15, where the data-replication system comprises seven functional modules:

a Pattern Discovery module that identifies and prioritizes queries that qualify as being hot at particular times of day;

a Block Mapper module that selects which subset of the first set of refresh data should be copied to each block of the first set of memory-resident blocks;

a Request Manager module that, in response to a determination that a first hot query of the set of hot queries requests access to two or more database tables of the target database, splits the first hot query into two or more hot queries that each request access to only one database table of the target database;

a Source Merger module that merges the first set of incremental data with the copy of the first set of refresh data stored in the first set of memory-resident blocks;

a Sender module, operating in the source computing environment, that transmits an updated block of the updated first set of memory-resident blocks to a Receiver module, operating in the target computing environment, when the Sender module determines that the updated block contains refresh data that has been updated with incremental data by the Source Merger module, and where the first set of memory-resident blocks are transmitted in an order that is determined by a priority assigned to each block by the Pattern Discovery module;

the Receiver module, operating in the target computing environment, which receives each memory-resident block transmitted, by the Sender module, from the source computing environment to the target computing environment; and a Target Merger module that copies each memory-resident block received by the Receiver module to the target database.

17. The computer program product of claim 15, where the first set of refresh data is data stored in the first database table that had previously been replicated to the target database during a most-recent previous data-replication job; and where the first set of incremental data is data stored in the first database table that had not been replicated to the target database during the most-recent previous data-replication job.

18. The computer program product of claim 15, where the data-replication system tracks the status of each memory-resident block by maintaining a set of data-replication configuration tables.

19. The computer program product of claim 15, where the first set of incremental data is a set of revisions to the first set of refresh data, where a first revision of the first set of incremental data is a revision to the first database table produced by a transaction submitted by a user after a performance of a most-recent previous data-replication job.

20. The computer program product of claim 16, where the Pattern Discovery module is trained to infer data-access patterns from timestamped historical records of access requests previously submitted to the database, where the training enables the Pattern Discovery module to intelligently identify, as a function of the inferred patterns, which user-submitted queries should be classified as being hot queries at particular times of day or days of the week, where the training further enables the Pattern Discovery module to intelligently assign a priority to each query of the set of hot queries as a function of the inferred patterns, and where the Pattern Discovery module determines an order in which fully updated memory-resident blocks are transmitted to the target computing environment as a function of the assigned priorities.

* * * * *